United States Patent [19]
Bezick et al.

[11] Patent Number: 5,746,656
[45] Date of Patent: May 5, 1998

[54] VIDEO GAME COMPETITION METHOD AND APPARATUS

[76] Inventors: William Bezick, 4138 S. Cook, Spokane, Wash. 99223; Allen E. Fiedler, P.O. Box 12660, Oldtown, Id. 83822; Jody Kerlee, 20017 Williams Lake Rd., Cheney, Wash. 99004; Shan Hemphill, E. 17505 Cataldo, Greenacres, Wash. 99016

[21] Appl. No.: 636,249

[22] Filed: Apr. 23, 1996

[51] Int. Cl.⁶ .................................................. A63F 9/22
[52] U.S. Cl. ........................................................ 463/42
[58] Field of Search ............................. 463/40, 41, 42, 463/43; 348/13, 461, 553, 571, 725; 386/46, 52; 380/10, 20; 455/3.1, 4.1, 4.2

[56] References Cited

U.S. PATENT DOCUMENTS

| | | |
|---|---|---|
| 5,042,061 | 8/1991 | Kaneko et al. |
| 5,083,271 | 1/1992 | Thacher et al. |
| 5,324,035 | 6/1994 | Morris et al. |
| 5,481,296 | 1/1996 | Cragun et al. ........................ 348/13 |
| 5,561,457 | 10/1996 | Cragun et al. ........................ 348/13 |

*Primary Examiner*—George Manuel
*Attorney, Agent, or Firm*—Wells, St. John, Roberts, Gregory & Matkin, P.S.

[57] ABSTRACT

An apparatus for video game tournament competition receives as its input the RGB signal to the video game screen which contains the final score obtained by the contestant. The RGB signal is directed to a composite converter where the signal is converted to a format which may be captured to a file, which file can then be processed by a computer. The composite converter sends its output signal to a video capture circuit which will capture the instantaneous image displayed on the video game screen which will contain the final game score. The capture circuit produces a captured video file which may then be processed by character recognition software in a local computer located at the site of the video game to extract the final game score in alphanumeric form from the captured video file. The score may then be sent to a remote computer which will collect a plurality of scores and at the end of the tournament determine the high score. The apparatus also provides a data input station for potential tournament players to enter personal information and payment to engage in the tournament. Player information is also transmitted to the remote computer. When the high score from a tournament is determined the associated player information is correlated with the score and the score is transmitted to all locales at which video game terminals are present which engaged in the tournament. A local player display is connected to the local computer for prompting players and potential contestants and for providing other useful information to contestants. The character recognition program compares a template unique to the video game against the captured video file to identify characters in the captured video file which represent the final game score.

27 Claims, 7 Drawing Sheets

VIDEO GAME COMPETITION METHOD AND APPARATUS

TECHNICAL FIELD

This invention relates to video games and in particular to a method and apparatus for playing a video game in a tournament competition.

BACKGROUND OF THE INVENTION

It has been recognized that players of video games may desire to engage in tournament competition whereby one player may pit their skills against those of other players to determine who is the best player of any particular video game. Further, operators of video games have recognized that tournament competition of this type can increase the number of players of video games and the number of games played by any given player, thus increasing revenue generated by the video games.

In U.S. Pat. No. 5,083,271, Thatcher et. al. teaches a method of connecting multiple video games at remote sites to a central computer. Scores from each video game are transmitted to the central computer which tracks player handicaps, player scores, and other information. In the system described by Thatcher, a player's final score after playing a video game is taken directly from the video game microprocessor output and transmitted to the central computer. Such a system requires access to the internal workings of the video game itself to extract a digital score capable of being processed directly by a computer. Obtaining access to the internal workings of the video game on the level required by Thatcher requires detailed intimate technical knowledge of the design of the video game itself, and may also require the permission of the owner or licensor of the video game.

It would therefore be useful to have a video game tournament system whereby players' final scores could be obtained and sent to a central computer of the type described by Thatcher without requiring access to the video game inner workings or permission of the video game owner or licensor.

It would be possible for a video tournament system which meets the above criteria to be implemented by allowing the players to enter their final score into a key pad which would then transmit the score to the remote location. However, such a system would not allow for verification that the score obtained on the video game is in fact the score entered by the player, without unreasonable supervision.

It is therefore an object of this invention to provide an automatic video game tournament system which does not require intimate technical knowledge of the video game circuitry or permission from an owner or licensor of the video game, but which still allows a player's final score to be automatically obtained and transmitted to a central computer which may then keep track of scores in the tournament.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
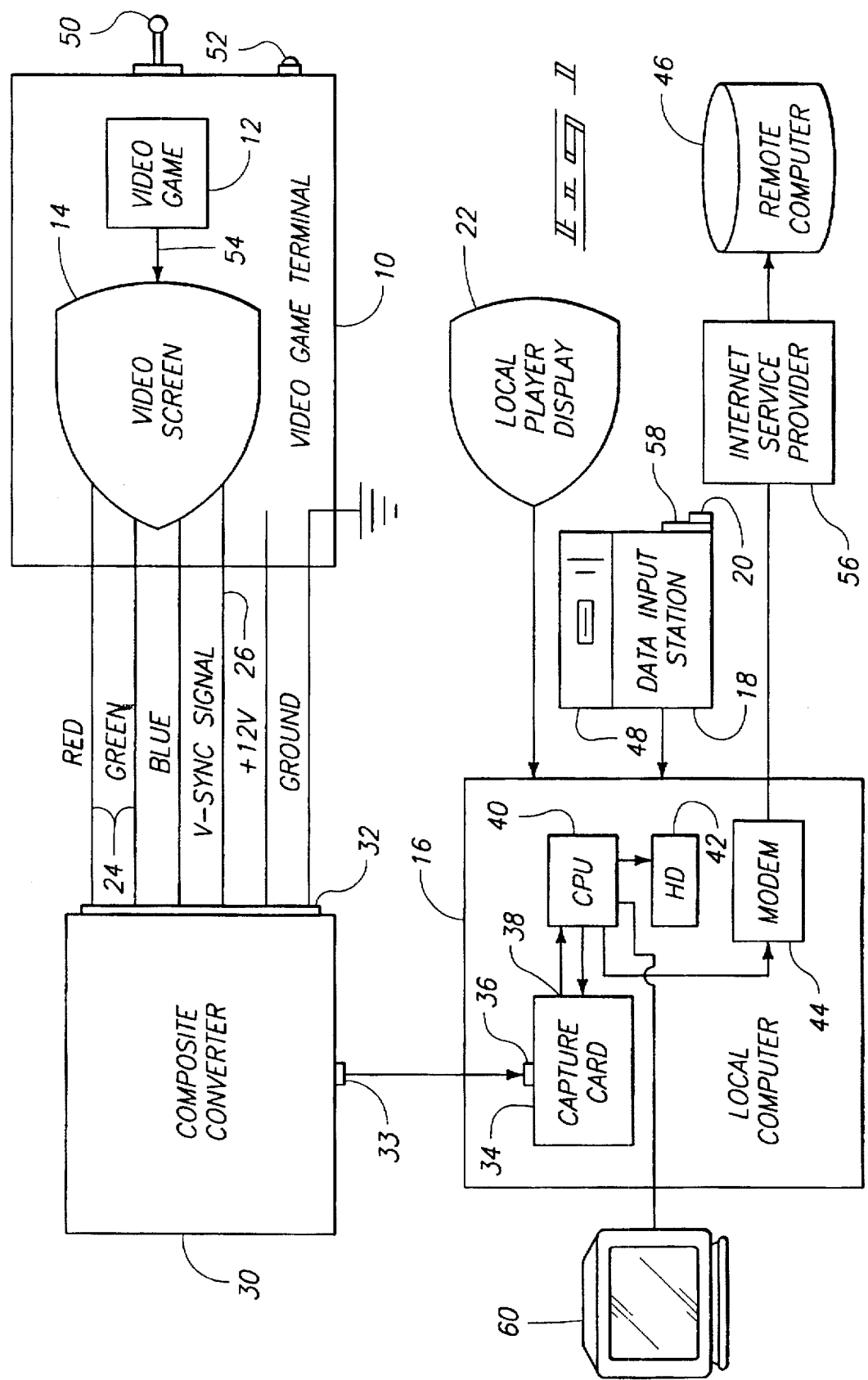
FIG. 1 is a schematic diagram showing the system of the present invention.

This disclosure of the invention is submitted in furtherance of the constitutional purposes of the U.S. Patent Laws "to promote the progress of science and useful arts" (Article 1, Section 8).

Our invention comprises a method and apparatus for conducting video game competition tournaments wherein the final score of a video game is captured from the video screen as it displays the final score of the game. In this manner, it is not necessary to access the digital circuits on the video game board itself as described in the background to the invention, but instead allows for any given video game to be easily modified so as to be capable of being played in a video game tournament. That is, one does not need a specially manufactured video game in order to be able to use the system of the present invention. Our invention further consists of a method for conducting such video game competitions using the concept of capturing the final video game score from the screen display. The invention further includes a method for recognizing the characters as displayed on the screen.

As used herein, the following terms will have the following meanings:

By "video game terminal" we mean the complete system which allows an individual to play a video game, especially a video game in an arcade, which typically comprises input devices to allow the players to control the actions and choices of characters or objects in the game (e.g., joysticks, buttons, etc.), a video screen for displaying action within the game and the final score obtained by the player of the game, and processing equipment for processing inputs from the players and generating random variables to interact with the player as well as video output signals which are directed to the video screen. The output to the video screen is typically an RGB composite signal. RGB is an acronym for "red green blue", the primary colors used in video circuitry to simulate all other colors.

By "video game" we mean a particular episode of a game played at a video game terminal, which is usually initiated by a player inserting money into the video game terminal, interacting with the video game terminal through the input devices provided at the video game terminal, and terminating with a final score which is displayed on the video screen.

By "alphanumeric information" we mean particularly that information comprised of letters and numbers which represents a player's final score after having played a video game.

By "video game competition" or "video competition" or "video game tournament" or "video game competitive tournament", we mean a tournament where multiple players of a particular video game will compete against one another to determine which player has the highest score after a finite number of games are played.

In the system of the present invention a potential player of a video game will elect to play in a competitive video game tournament. He or she will pay the tournament competition fee, typically by entering payment in the form of paper money into a bill feeder or coin into a coin slot at a data input station associated with the video game terminal. Alternately, payment can be paid directly to an individual and the individual can enable the video game to accept player information to allow the player to enter the competition. After payment has been made by any means, a local player display, which is a visual output device, will prompt the player to enter the player's name and other player information which will be helpful in identifying the player Examples of player information include the name, address, phone number, and other relevant personal information pertaining to the player. The local player display is typically a video screen, preferably a monochrome video screen, which works in conjunction with the data input station. Once the player information has been entered, the player may select a player identification name. Preferably a unique player identification name will be automatically generated by a remote computer which acts in conjunction with the local computer which controls the apparatus for conducting video game tournament play at the computer game terminal. The remote computer may also generate a unique player password, or preferably the player may select their own password. Thereafter for the duration of the tournament the player need only enter their player identification name and password and make payment for the playing of the video game itself to participate in the video game tournament.

After a player has played a video game and the final score is displayed on the video screen, the player will prompt the local computer to capture the score by pressing a button or the like on the data input station or a button specially mounted on the video game terminal. At this point, computer programs within the local computer will cause the image currently displayed on the video screen to be captured. By capture we mean that the video image is saved in a digital format. The process of capturing the video image is discussed below. Once the video image has been captured and saved to a video capture file, a character recognition program will be applied to the file to extract the alphanumeric information therefrom, which will include the player's final score. The final score as identified by the character recognition program will then be displayed on the local player display along with a prompt for the player to either verify that the score is correct or is incorrect. Scores which are identified as being incorrect will be saved with a special format so that they may be later analyzed should a dispute arise. The local computer will then transmit the verified or unverified score to a central remote computer. Although many modes of communication between local computers and remote computers exist, in the preferred embodiment we prefer to use the Internet as the communication link between the two computers.

The remote computer has memory storage for storing received final scores as well as player information, which is also communicated to the central computer from the local computer. The central computer further has a database program which allows it to sort the final scores received in order to determine the highest or winning score, and correlate that score to the player who obtained the score, as well as identify the location at which the player obtained the score. The database program further keeps track of the number of players which have registered to play in the tournament and the total number of games played in any given tournament. A tournament may be defined by a predetermined number of games or, preferably, by a predetermined number of registered players. Once the defined end of the tournament has been reached, the remote computer will terminate the tournament by identifying the winner thereof and disable future play of the tournament (described in more detail below). Thereafter a new tournament may be initiated with either the same or a new video game and competitors may register to compete as described above.

With respect to FIG. 1, apparatus of the present invention is shown. A video game player will play a video game 12 at video game terminal 10. It should be noted that the video game terminal is not a part of the apparatus of the present invention, but merely interfaces with the apparatus of the present invention. A player of a video game will enter payment in the form of coins, tokens, or other into slot 52 which will then enable the player to play the video game. The player will interface with the video game through player interface 50. The video game terminal comprises hardware, firmware, and perhaps software, which generates images on a screen in a semi-random pattern and allows for inputs by the player from the player interface 50. The video game terminal generates a video signal which is displayed on the video screen 14. The video game terminal transmits the video signals to the video screen in the form of video output signals which comprise an RGB composite signal. "RGB" is the acronym which stands for "red green blue" which are the three primary colors used to make up a video image. The RGB composite signal further comprises a synchronization signal, a power connection and a ground. The RGB composite signal, also known as the video output signals, are communicated to the video screen by way of a hard wire connection, thus allowing for the video output signals to be intercepted by splicing into the output connection 54. All of the details described thus far pertain to the video game terminal, which is well known in the art and does not comprise a component of the present invention, but is connected to the present invention.

The apparatus of the present invention begins at the composite converter 30 which is known in the art, and which is connected to the video output connections at the video input connection 32 so as to receive video output signals from the video game terminal via leads 24 and 26. The composite converter 30 comprises a video signal processing circuit (not shown) for converting video output signals received from the video game terminal into a capturable video signal. By a capturable video signal we mean a video signal which may be captured by a video capture circuit, described below. In the typical implementation of the present invention, the capturable video signal will be an analog or radio frequency image signal. The composite converter further comprises a composite converter output 33 which sends the capturable video signal to the video capture circuit 34. In one example the composite converter was an RGB-to-composite converter manufactured by J.C. Research, Inc.

It should be pointed out here that some video game terminals may produce a video output signal which is compatible directly with a video capture circuit, obviating the need for the composite converter. Further, it is conceivable that a video game terminal may produce a digital video output signal, thus obviating the need for the analog-to-digital signal conversion which is currently provided by the video capture circuit.

The video capture circuit 34 comprises a video capture input 36 for receiving the capturable video signal from the composite converter 30. The video capture circuit further comprises a circuit for actually capturing the capturable video signal into a captured video file. By "capture" we mean that the image comprising the display shown on the video screen at a particular instant has been stored to a memory device in a digital format. An analogy is taking a still picture of a moving scene. The video capture circuit further comprises a video capture output 38 to allow the captured video file to be sent to a processor or stored in a memory device. In one example the video capture circuit was a Hauppauge Win TV video capture circuit. The video capture circuit should have sufficient capacity in the form of memory and processing capabilities to capture a sufficient portion of the video screen display to insure that the final game score is captured in the captured video file. A typical video game screen is 400 pixels wide by 300 pixels high. Video capture circuits having capacity to capture an 400× 300 pixel image are commercially available. However, since the final game score appears only in one consistent portion of the game video screen for each video game system, there is no need to capture the whole image, but only that portion containing the final score. Thus, by manipulation of the video capture circuit, it is possible to capture only that portion of the screen display containing the final score. This will have the beneficial effect of reducing the size of the captured video file and therefore subsequent processing of the captured video file. Although in FIG. 1 the video capture circuit 34 is shown inside of the local computer 16, there is no requirement that the video capture circuit be inside the computer and may in fact comprise an external circuit. Further, while the composite converter 30 is shown as being external to local computer 16, it may in fact be placed within the local computer or integrated into the video capture board itself.

The video capture circuit video capture output 38 will send the captured video file to the central processing unit (CPU) 40 where it will then be either stored in semi-permanent memory or random access memory (RAM) where further processing of the captured video file may be performed. The local computer further preferably comprises a semi-permanent memory storage device 42 which will typically be in the form of a hard drive, but may be any form of semi-permanent data storage such as a diskette or an external memory device. Local computer 16 further comprises a communication device 44 shown here as a modem which is shown as internal to the computer. The communication device may in fact be external to the local computer and may comprise communication devices other than a modem, for example, an Ethernet card. The communication device 44 communicates with remote computer 46 via communication system 56 which will be obvious to those skilled in the art. In the preferred embodiment the communication system comprises an Internet link through an Internet service provider. Local computer 16 will be programmed with a control program, a score capture program, a final score verification program, and a character recognition program, all described further below.

Figure 3:
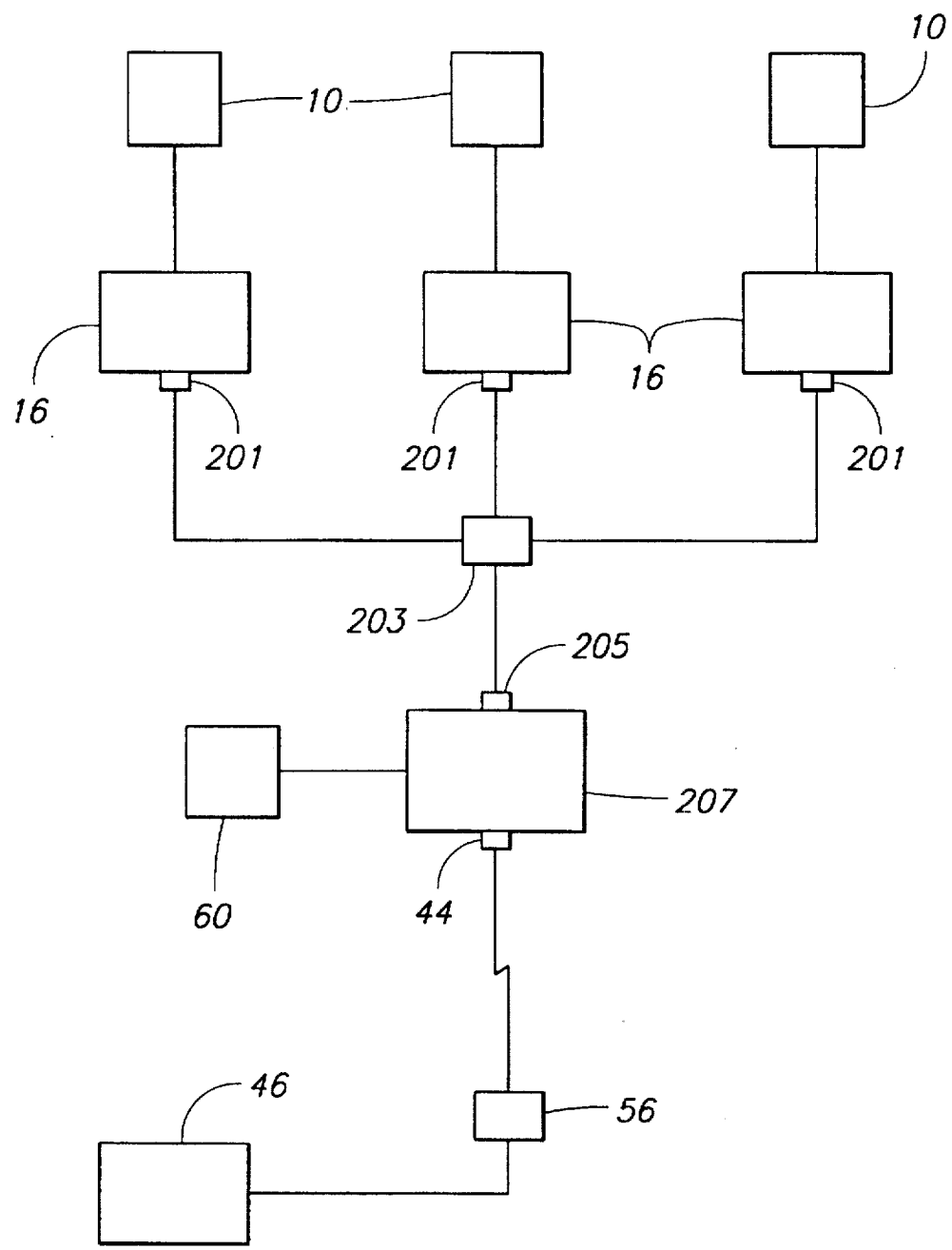
FIG. 3 is a schematic diagram showing a series of systems of the present invention linked together into a local network.

In the preferred embodiment, with reference to FIG. 3, a plurality of video game terminals 10 are individually connected to local network computer 207 by network interface cards 201 and 205 through network hub 203. Such local networking is well known as is described in many texts on "Local Area Networks" or "LAN's". In this instance each local computer does not have its own dedicated modem, but they all share modem 44 which is associated with the local network computer 207. The local network computer communicates with the remote computer 46 in the manner described above and more fully described below. In the preferred embodiment each local computer 10 does not have its own dedicated semi-permanent memory storage device 42, but instead the memory storage device 42 is located in the local network computer. This configuration will reduce cost and complexity of the overall system where a plurality of video game terminals at a local site are to be connected for tournament play through the apparatus of the present invention. In the remaining detailed description it is understood at all times that relationships between the local computer 16 and the remote computer 46 may be accomplished through a local network computer 207 in the manner described above, and that certain functions described as occurring within the local computer 16 may in fact be performed within the local network computer.

Referring again to FIG. 1, operating in conjunction with the local computer is a data input station 18 Date input station 18 further comprises an apparatus for receiving payment 48 for allowing a player to engage in tournament video play, which may be a bill feeder, a coin slot, or a credit card reader, or any combination thereof. Data input station 18 further comprises a keypad 58 or other data entry device for allowing a player to enter player information at the data input station. The data input station further comprises a capture button or switch 20 which may be one of the buttons on keypad 58 for causing the video game competition apparatus to capture the final score from the video game terminal, as well as for performing other functions such as accepting a final score following score verification. Capture button 20 may alternately be located on the video game terminal 10, but will still work in conjunction with the local computer 16 as described further below.

Local computer 16 is in communication with a local player display 22. Local player display 22 serves multiple functions such as prompting players to enter the tournament by entering tournament payment and player information, prompting players already entered in the tournament to enter their name and password, prompting the player to capture the final game score, and prompting the player to verify or reject the final score extracted from the video image as being the same shown on the video screen.

The apparatus may also comprise a local public display 60 which will be driven by the central processing unit 40 of the local computer. In the preferred embodiment wherein a plurality of video game terminals are to be linked as shown in FIG. 3 as described above, the local public display 60 is driven by the local network computer 207 and not the individual local computers 16. Local public display will be configured to display the names and other information including the high score relating to previously played or ongoing tournaments, information regarding upcoming tournaments, advertising information, and other information which may be useful or beneficial. Local public display may be a television monitor, an electronic sign board, or may alternately be the video screen 14 itself. Preferably the local public display is a computer monitor which offers high resolution. Where the local public display is the video game screen, the CPU sends an output signal to a video card not shown which then sends a video output to RGB connections 24. Remote computer 46 is configured to accept signals communicated from local computer 16 via communication system 56.

Information sent from the local computer (or the local network computer when used) to the remote computer includes player information as well as extracted final scores and captured video image files. By extracted final scores we mean those scores which have been captured from the video screen, processed by the video capture circuit, processed with the character recognition program to extract any alphanumeric information contained within the video screen display, and saved as a text file which includes the extracted final score. Remote computer further comprises a data base program for saving player information, extracted scores associated with players, information regarding the locations of video games which are configured to engage in tournament play for any given tournament, and information regarding the number of games to be played for any given tournament and the number of games played at any given time. The data base program further allows the remote computer to sort all of the data saved relative to any given video game competition to determine the highest final score and the associated player. Information from a plurality of local computers which is sent to remote computer 46 is stored in a central memory device (not shown) which is in communication with the data base program. The remote computer 46 is controlled by a master program which coordinates the receiving of information from remote computers, the storing of received data and processed data into the central memory device, the operation of the data base program, and the sending of signals or messages from the remote computer 46 to local computers.

We will now describe in detail the method of operation of the invention.

As described above, a video game player will elect to compete in a video game tournament or video game competition wherein a plurality of contestants will compete against one another to determine which player has the high score. The tournament is defined by a predetermined number of video games or preferably by a predetermined number of registered players. For example, a tournament may be defined as 6,000 contestants. That is, once the 6,000th contestant has registered to compete in the tournament, the tournament will be allowed to continue only for a predetermined number of remaining games or days to allow the last registrant to compete. Following that defined endpoint, the tournament will end. At that time a winner will be declared, the winner typically being the player having the highest score. It is envisioned that the tournament will link multiple video games at several geographically remote locations so that players from different locations within a city, state, or worldwide may compete in the same tournament.

The tournament contestant will typically pay a fee to enter the tournament, although a fee is not necessary to the invention. Thereafter, the contestant only pays the fee required to play a video game as if the contestant were not in the tournament. Although it is envisioned that the tournaments will be played from fee-for-play video game terminals, this is not a requirement, and in fact remote home video game systems may be used equally well in the present invention. At the time that the one time fee for the tournament is paid or, if no fee is to be paid, at any time, the player enters player information into a keyboard 58 at a local site where a video game terminal 10 which is preselected to be the game for the tournament is located. The player information is then communicated to a remote computer 46 which keeps track of all player information. Information is communicated to the potential contestant by the local player display 22 which is in communication with the data input station by way of the local computer 16. The local player display will prompt the contestant to either enter the tournament by making the payment to become a tournament contestant or to enter the user identification and password if the contestant is already entered for the tournament. Upon making the initial payment for the tournament, which can be made to a bill feeder or coin slot connected to the data input station, the data input station will prompt the contestant for the contestant's name, address, phone number and the like and will assign or allow the player to select a player identification and a player password. In the preferred embodiment, the system will automatically assign the contestant a player identification so that there will be no chance for two different contestants to select the same player identification and password. However, player will be free to select their own player password. Communication between the data input station and the local computer is managed by a local control program contained within the local computer. The local control program can be modified to request various information from the contestant, to communicate information to the contestant, and to perform a variety of other tasks in interfacing between the local computer and the contestant. For example, the local control program may prompt the contestant to verify that the player information entered is correct.

Once the player information has been entered, the local computer will transfer the player information to the remote computer 46 via communication device 44. Thereafter, the player merely needs to enter the player identification and password and pay the fee required to play a video game as a player would normally. Upon entering player identification and password, the local computer 16 will query the remote computer 46 to determine if the player is registered and to verify that the tournament is still being conducted. Upon receiving confirmation from the remote computer that the player is registered and the tournament on-going, the player may begin play. At this time, in the preferred embodiment, the local player display will prompt the player to begin playing the video game. If for some reason the player is not registered or the tournament has been terminated, the local player display will notify the player. In the preferred embodiment the player must, prior to each video game played in the tournament, enter the player's identification and password at the data input station. By so doing, the player will cause a control program stored within the local computer to become active and query the central computer and provide player prompts, as described above, including a prompt for the player to press a certain button when the player has finished playing the video game and desires to capture the final score. It should be observed that the programming at the local and remote computers can be modified to allow the player to enter player identification and password only once, and then continually play video games (i.e., "log in" to the tournament play mode) until such time as the player logs out of the tournament play mode.

Once the player has completed playing the video game, a final score will be displayed on the video screen 14 at the video game terminal 10. At this point if the player desires to enter the final score in the tournament, the player will press a capture button 20 or other activation device on the data input station 58 which will typically be marked with a legend such as "capture score". Alternately, the local player display 22 may prompt the player to press a certain button, e.g., an "enter" button, if the player desires to capture the final score. When the player engages the button or switch 20 to capture the final score, the control program in the local computer will transfer control of the computer to a capture program. By way of the connections from the video game terminal 10 to the composite circuit 30, and from the composite converter circuit 30 to the video capture circuit 34, at any given time the video capture circuit will be receiving the game video screen output in real time. Upon receipt of a "capture" signal, the video capture circuit will capture the video image which it is receiving from the composite converter at that instant in time. Thus, the capture program will send the "capture" signal to the video capture circuit causing it to capture the then received video image which contains the player's final score.

The video capture circuit 34 allows the video image to be captured in a format which will allow it to be processed further by the local computer. In the preferred embodiment, the video capture circuit captures the image in a 256 color format. The video capture circuit output 38 is then directed to memory within the local computer, preferably random access memory. At this point an image processing program may be used to enhance the output from the video capture circuit to allow for enhanced processing of the captured image. In the preferred embodiment an image processing program is used to convert the 256 color captured video file into a 16 color captured video file. The enhanced video file is then saved into memory, preferably on a hard drive 42 or other semi-permanent memory device. The capture program then applies an image or character recognition program to the captured video file for the purpose of extracting the displayed final score from the captured video file. The operation of the character recognition program is further described below. Once the character recognition program has extracted any alphanumeric information from the captured video file, which alphanumeric information contains the presumed final score, the alphanumeric information is saved to a text file having a unique file name to specifically identify any given captured score. The capture program then reads the text file which contains the presumed final score in an alphanumerical format. We have used the term "presumed final score" since images displayed on video game video screens are typically in multiple colors and may not be of the highest resolution, and there is the possibility that an alphanumeric file may not contain a score which is identical to the score displayed on the video screen. Therefore, a final verification check is provided in the capture program. The capture program causes the presumed score from the alphanumeric file to be displayed on the local player display and also prompts the player to verify whether the score is correct or not. If the player verifies that the score is correct, the alphanumeric file will be tagged with information identifying it uniquely to the player and it will then be communicated to the remote computer by the communication device. If the player does not agree that the alphanumeric file contains the correct score and enters a negative response, the local computer will change the sign of the score to a negative sign (a negative score is not possible in a video game), and will transmit the modified alphanumeric file to the remote computer. In this manner it will be possible to identify those scores which are contested. The remote computer will be able to correlate the transmitted final score to the player by virtue of the fact that the local computer and remote computer communicate when the contestant logs-in, as described above.

In the preferred embodiment, the file of the captured image is also transmitted to the remote computer along with the final score. This will allow the high scores and contested scores to be verified by human viewing of the captured image or further processing of the captured video image file. At this point, the capture program will return control of the local computer to the control program.

Following completion of the game the player will once again need to enter the player identification and password at the data input station and enter payment into the video game terminal to play a subsequent video game, unless the local computer control program has been configured otherwise.

Figure 2:
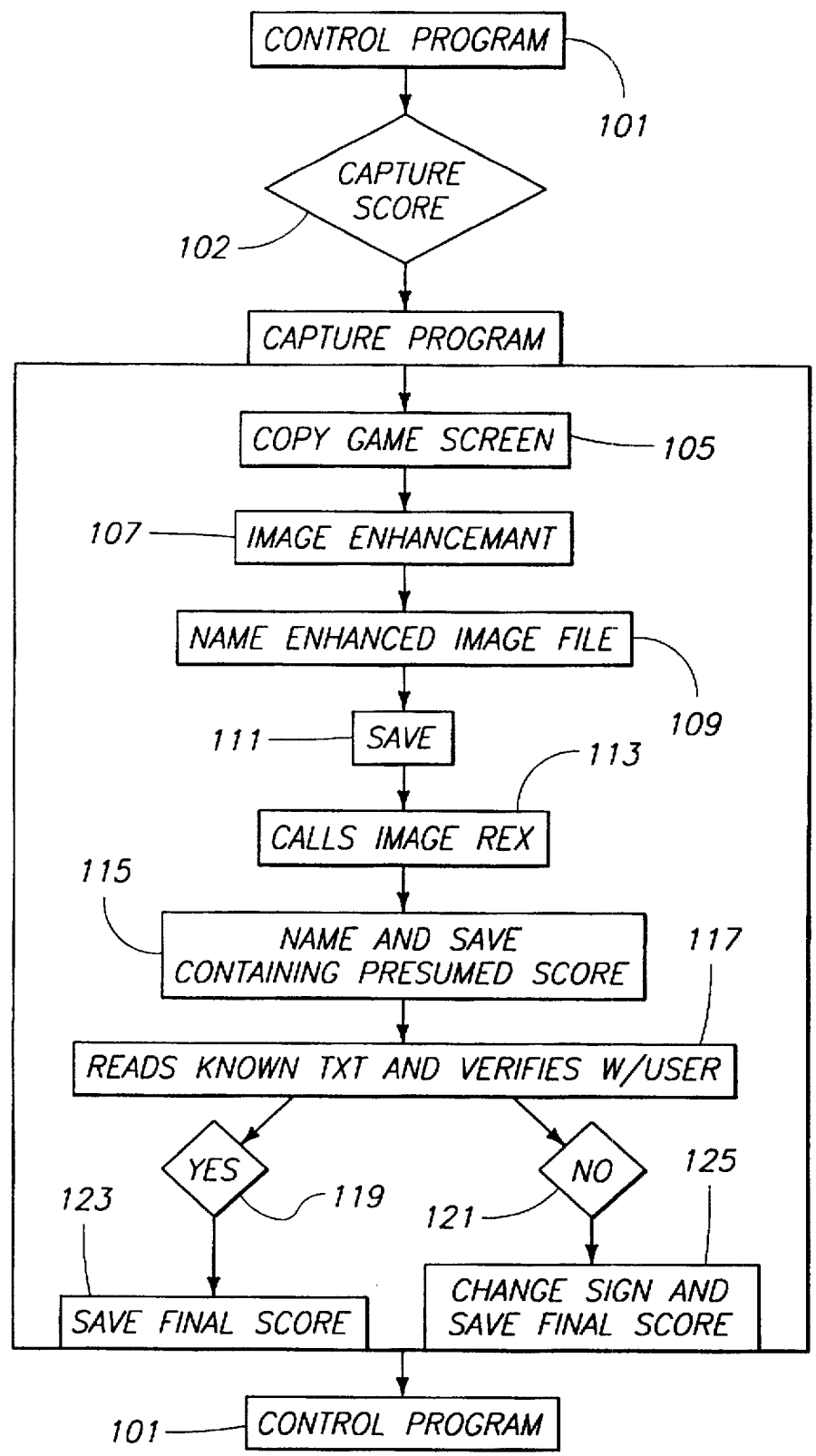
FIG. 2 is a flow chart showing the computer program schema for the computer programs located on the local computer.

FIG. 2 shows a flow diagram of the capture program. It is seen that the local computer is under control of the control program 101. Upon receiving a "capture score" signal 102 from the data input station capture button (item 20 in FIG. 1), the control program transfers control of the local computer to the capture program 103. The capture program comprises a series of subprograms or calls to subprograms which operate in the sequence indicated. The capture program comprises the following calls or subprograms: "capture game video screen" 105, "call image enhancement" 107, "name enhanced image file"109, "save enhanced image file" 111, "image recognition" or "character recognition" 113, "name and save file containing presumed score" 115, and "read presumed score file and verify with user" 117. At this point the capture program prompts the player to verify the score, as described above. The player may either accept the presumed score (indicated by the "yes" signal 119), or reject the presumed final score (indicated by the "no" signal 121). Upon receipt of a "yes" signal, the capture program will execute "save final score" 123 and return control of the local computer to the control program 101. Upon receipt of a "no" signal, the capture program will execute "change sign of the final score and save" 125, and then return control of the local computer to the control program 101.

The remote computer 46 will keep track of the total number of players registered for any given tournament. As described above, upon reaching the number of registered players predetermined for a tournament, a predetermined number of remaining games will be allowed to be played or, preferably, the tournament will terminate a predetermined period of time following the registration of the last contestant, typically a few days. Following the occurrence of the tournament terminating event, the remote computer refuse to allow further registrations and will not verify registrants who attempt to play in the tournament, as described above. Alternately, the remote computer may signal all local computers connected to it for the given tournament that the tournament has come to an end and not to accept any more registrants for tournament or video game scores for the tournament. The remote computer will also, using its data base program, identify the highest score obtained in the tournament and the associated or corresponding player having achieved the highest score. This information will then be communicated to each local computer or local network computer which was associated with a video game terminal engaged in the tournament. The information may then be displayed locally either at the local player display 22 or at a local public display 60 which may be an independent display or may be the video screen display 14. The method of causing displays to be shown locally is well known in the art and will not be described further herein It should be appreciated that the remote computer may collect a great deal of information regarding the players, the video games, the number of games played by particular players, the number of games played at particular sites, etc. This information may be sorted in numerous ways to extract special information such as the highest scores achieved at a particular site, the number of games played within a time period, etc. This information may then be displayed at the local public display or may be extracted and used for a variety of purposes. For example, it would be possible using the system described to identify those players playing in tournaments most often and then distribute custom information to them such as advertisements and the like.

In one example the control program at the local computer was written using Oracle Power Objects, a software program available from Oracle Corporation, Redwood City, Calif. The score capture program was written in PowerScript, a software program available from Desiderata Software company. The capture program will typically use the software which is provided with the video capture circuit by the manufacturer to cause the captured video file to be created. Alternately, software known in the art may be purchased or written for this purpose. In one example where the Hauppauge Win TV video capture circuit was used, the software provided with the capture circuit by Hauppauge was used to create the captured video file. In the same example the image enhancement program used to convert the captured video file from a 256 color file to a 16 color file was Microsoft Paint which is available with the Microsoft Windows operating system software from Microsoft Corp., or it is available separately.

As described above, many times the captured video file will contain an image which is difficult to process for character recognition. The variety of colors of the characters displayed on the video screen 14, the variety of colors which surround the characters on the video screen, the varying shapes and sizes and locations of the characters displayed on the video screen, as well as the lack of resolution of the video screen itself, will all contribute to character recognition problems. Since the present invention is intended to be used with any video game terminal, a large variety of final score formats and characters will be encountered. It is therefore necessary to provide the invention with a character recognition program which is sufficiently robust to identify the characters in any given video game. Although commercially available optical character recognition ("OCR") software may work on certain video game terminals for identifying the final score by processing the captured video file with the OCR software, we have discovered that many times commercially available OCR software is not sufficient to identify the displayed characters accurately, if at all. Although we have used the term optical character recognition software, it should be recognized that optical character recognition software does not require an optical link to the characters being processed for character recognition. Most commercially available OCR software may be used to process a stored digital representation of an image. This processing of a stored image is not "optical character recognition" per se, but will be known as "OCR" herein for the sake of standardization. We have discovered that, although character types and presentations may vary widely from game to game, any particular video game will have sufficient commonality between any display of the same characters to allow for common features to be identified for that character. Thus, displayed characters can be compared to a record of those common features to identify similarities and differences between the then displayed character and the commonalities. In this manner a then displayed character may be matched to a known character having a high number of commonalities or similarities. Alternately, a low number of differences between the displayed character and the known character may also indicate a match.

Modern video games, rather than simply displaying a numerical score which increases as the player's skill and time of play increase, typically display a stage or level that a player has achieved and the time that the player was able to play the game before the game terminated. For example, in many of the modern video games which represent the player fighting against enemies, a typical score might be "STAGE 5 10:34". This would indicate that the player has risen to the fifth level of the game and was able to survive for a total time of 10 minutes and 34 seconds. Thus for this score the character recognition program would need to identify that portion of the screen which identifies the stage and the number of the stage, as well as the characters identifying the time. Since the video screen is made up of a collection of pixels, and each character is identified by certain pixels having a coloration and pattern distinct from the pixels in the proximity to the character, it would be possible to look at each portion of the screen to see if it contained a pattern and coloration of pixels which had sufficient similarities to any given character to say with a certain degree of certainty that the pixels represent a given character.

Figure 4:
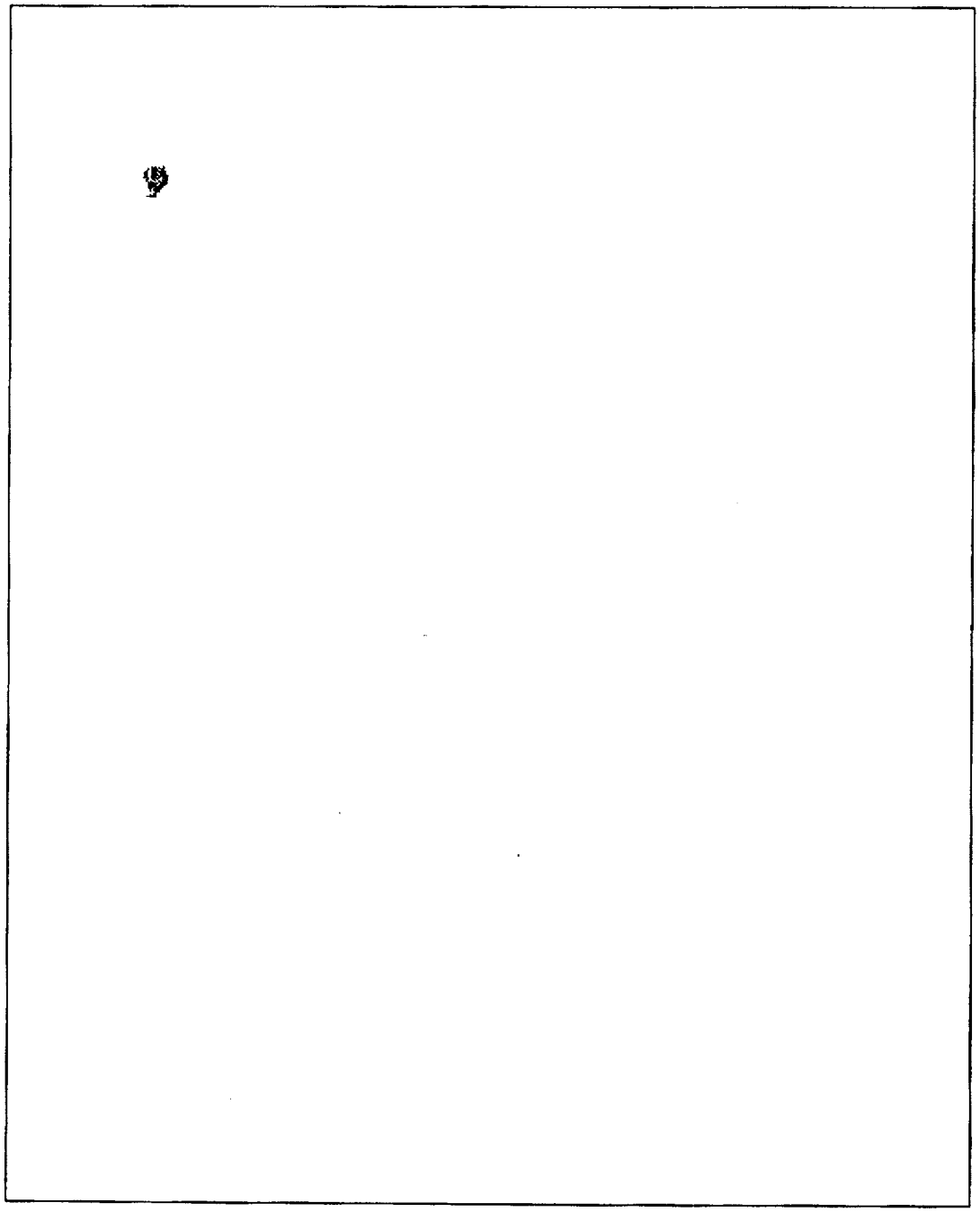
FIG. 4 is a normal size template used in the character recognition program.
Figure 4A:
FIG. 4a is an enlarged diagram of the template used to identify the digital representation of the character "1" from a captured video file.
Figure 4B:
FIG. 4b is an enlarged diagram of the template used to identify the digital representation of the character "2" from a captured video 11 file.
Figure 4C:
FIG. 4c is an enlarged diagram of the template used to identify the digital representation of the character "3" from a captured video file.
Figure 4D:
FIG. 4d is an enlarged diagram of the template used to identify the digital representation of the character "4" from a captured video file.
Figure 4E:
FIG. 4e is an enlarged diagram of the template used to identify the digital representation of the character "5" from a captured video file.
Figure 4F:
FIG. 4f is an enlarged diagram of the template used to identify the digital representation of the character "6" from a captured video file.
Figure 4G:
FIG. 4g is an enlarged diagram of the template used to identify the digital representation of the character "7" from a captured video file.
Figure 4H:
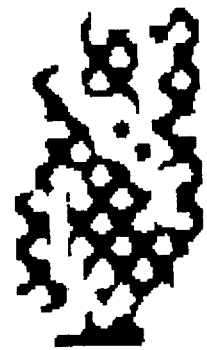
FIG. 4h is an enlarged diagram of the template used to identify the digital representation of the character "8" from a captured video file.
Figure 4I:
FIG. 4i is an enlarged diagram of the template used to identify the digital representation of the character "9" from a captured video file.
Figure 4J:
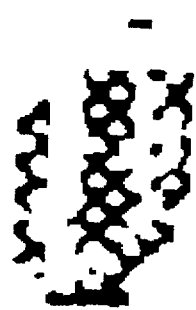
FIG. 4j is an enlarged diagram of the template used to identify the digital representation of the character "0" from a captured video file.

Since the modern video game is almost always a game having a color video screen, it is necessary to allow for the characters to have a plurality of colors as well. We have discovered that it is helpful to convert the captured video file from a 256 color file to a 16 color file to force the character colors into the minimum number of colors without loss of all distinguishing information. However, depending on the video game selected, fewer colors may be determined as still providing sufficient information to distinguish the character. In most instances the characters will convert to one or two colors after the image processing or enhancement program has converted the captured video file from 256 to a 16 color format. Since each character will be represented by a collection of pixels on the screen, and since each collection of pixels on the screen will be represented by a portion of the digitized captured video file, it will be possible to compare portions of the digitized captured video file to templates representing known digitized video images of known characters to look for similarities between the digitized portions of the captured video file and the digitized known characters. Since the universe of characters is finite, it will be possible to compare each portion of the captured video file to the digitized image of all known characters to determine which known character is most like the portion of the captured video file. This is essentially a process analogous to holding up an image and holding up various templates to the image to find the template which most nearly matches the image. For that reason, we have termed the digitized image of known characters as "templates". Thus, each template is compared to a portion of the captured video file to determine if a character exists, and if so, which character is present. This process is performed for each portion of the captured video file likely to contain a character until the whole captured video file has been processed and all characters therein identified. Since for each specific video game the score will typically appear in the same location, a set of templates may be generated which look for a character match only in those locations of the captured video file where characters are likely to be. These locations are the "portions of captured video file" described above. In one embodiment of the invention, each template is actually a template for the entire captured video file, however all but the relevant portion of the file, i.e., the portion where a character is likely to be, is "blocked out" by the template, so that the comparison only need focus on the selected portion of the captured video file. An example of such a "full screen" template is shown in FIG. 4, which is a template for the character "9".

We have also discovered a novel method for performing the comparison between the portion of the captured video file which may contain a displayed character and the template to determine if the portion of the captured video file matches any of the character templates. In this method, each portion of the captured video file is compared to the full set of templates. For each template the digital similarities between the portion of the file being compared to a template and the template are counted. The comparison is done as follows: First, the number of digitally represented pixels in the portion of the captured video file which correspond to digitally represented pixels in the template are counted. We will call this number the "hit" number, since the objective is to determine how many of the represented pixels in the captured video file are "hits" against the template. This number is then divided by the total number of digitally represented pixels in the template, giving a "hit ratio". Obviously, the higher the hit-ratio, the more likely it is that the portion of the captured file corresponds to the template.

If a hit-ratio of zero is obtained, it is likely that the portion of the captured video file being processed for character recognition does not contain a character. This is likely to happen since lower scores will not fill all available fields (i.e., if there are 6 character fields allowing for a maximum score of 999,999, a score containing only 5 or less digits will not fill all available fields). When a hit-ratio of 0 is obtained, the field is written to zero However, it may occur that only a very low, non-zero hit-ratio is obtained. In this instance it may be that through degradation of signal or for some other reason, the character does not match well with any of the templates. When this occurs, further processing may be in order. A threshold can be predetermined at which further processing is done, or the character is defaulted to zero. For example, a hit-ratio of less than 0.05 may be set as the value at which a character is defaulted to zero. Between hit-ratios of 0.05 and 0.5, further processing is done. Above 0.5, the character template associated with the highest hit ratio is selected. If two hit ratios above 0.5 are present, further processing may be in order.

Further processing which we have found to be helpful in identifying hard to recognize portions of captured video files consists of determining the number of pixels in the portion of the captured image being processed which fall outside the template. Obviously, the lower the count the greater the probability that the portion of the captured video file matches the template. An analogy might be considered "counting how much the image colored outside the lines of the template". This number will be called the "overfill number". The character corresponding to the template generating the lowest overfill number will then be selected as the character. Alternately, the hit-ratio may be combined with the overfill number to calculate a probability number of a match. Since a high hit-ratio is desired, and a low overfill is desired, dividing the hit-ratio for a template by the overfill number for the same template will provide a product for that template. The template producing the highest product number will then be selected as the "matching" template, and the associated character is then selected for that portion of the captured video image file. This is but one example. The hit-ratio number and the overfill number may be combined in a variety of methods by any given mathematical functions, for example they may be weighted (that is, each number may be multiplied by a factor depending on its perceived significance), the numbers may be multiplied, divided, added, or otherwise mathematically operated on in conjunction with one another or separately to determine a final number being a probability number that the portion of the captured video file matches a particular template.

The above comparison process is performed for each template which may correspond to a character at a position identified with the portion of the captured video file. After all templates in the set have been applied to a portion of the captured video file where a displayed character may be, and a set of probability numbers are generated for that portion of the captured video file, the highest probability number is selected, as described above. That number will necessarily correspond to the template which generated the highest probability number, and the template will correspond to the character associated with the template. In that way the character which most nearly or has the greatest likelihood of corresponding to the displayed character is identified. This process is performed for each portion of the captured video file until the whole captured video file has been processed to extract all alphanumeric information therefrom.

By image processing the captured video file prior to performing the character recognition process, it may be possible to identify large portions of the captured video file which do not contain characters and thus eliminate those portions from the captured video file to reduce the size of the file and the subsequent character recognition processing required. Such image processing is known in the art. For example, an image processing program may be able to identify randomness and thereby identify those portions of the captured video file which are background image. However, the full-screen templates described above, an example of which is shown in Fog. 4, should obviate the need for such pre-processing of the image file.

We have also discovered a novel method for generating the templates for the character recognition program described above. For any given video game system (that is, all video game terminals which will play the same video game over), it is possible to generate a unique set of templates which have a high probability of providing correct identification of characters in the captured video file. In the method, for any given game system, video game screen displays are generated which eventually collectively will contain all alphanumeric information or characters or figures which may be displayed and comprise an essential part of the final game score. Generating such displays may be done simply by playing the game time and time again until all such characters have been generated. Once a screen display containing a desired character has been generated, it is possible to capture the screen image in the manner described above using the video capture circuit. Since the captured image will contain a known character at a known location, it is possible to identify the particular digital representation in the captured image which corresponds to the character displayed on the video screen. For example, if it were desired to capture the digital representation of the video image of the number "1", the image containing that number would be captured and saved to a file. The file would then be analyzed to determine the digital representation of that number. As previously discussed, the file will typically be saved in a 16 color format so that the digital representation will actually be a digital representation of a collection of color pixels. For each possible character a plurality of images are generated so that typical commonalities and differences between one image display of a character and another image display of the same character may be determined. The commonalities are then consolidated into a composite, which will be known as the "template". We have found that an optimal number of image generations of the same character to determine commonalities and differences is approximately four. More than four images tends to obliterate any meaningful information since the differences continue to manifest themselves and it will be found that there are no pixels or digital representations thereof common to all images. Less than four images will typically not provide sufficient information to identify similarities. This process of identifying commonalities of display for individual characters is performed for all characters until a complete set of templates is generated.

In the preferred embodiment, five image generations may be compared. The commonalities which best suit four out of the five images will then be selected as the commonalities for a template Since a template may consist of up to 100 "pixels", it is best to be able to pick the commonalities out of the five images that best match for each of the 100 pixels, rather than for the whole image. That is, for five images there will essentially be 500 pieces of data to select from to compile the image, rather than only the four or five complete images. This may alternately be considered as obtaining a "consensus" among the five images of which are the best pixels to use for the template.

As part of the template generation process it is also necessary to identify those portions of the representative character image files used to generate the templates which are "background". By background we mean that portion of the display which would constitute the background display behind the character. In reality the portion designated as "background" is really the pixels in the near proximity to the image of the character. We have found that because the backgrounds vary from game to game, that in comparing approximately four images of the same character there are few if any similarities between background, and the background representations will essentially disappear. However, in some video games the alphanumeric information is displayed over a field having a constant color. In this instance since there are never any significant variations between one background and the next, it is easy to, by an algorithm in the template generation program, recognize that no differences are occurring and therefore the surrounding pixels must be background rather than information representing the character.

Once the commonalities between displays of the same character have been identified and the background effects eliminated, a completed template is produced. FIGS. 4A through 4J show enlarged black and white representations of the pixels represented by the digital templates which are generated by the above process. FIGS. 4A through 4J correspond to the characters 1 through 9 and then 0, respectively. It can be seen that these figures have little resemblance to their Arabic number equivalents.

It is desirable in generating templates that each template should have a similar same amount of information representing pixels. This allows for a better comparison to be made between hit ratios for the characters in the captured video file when performing character recognition on that portion of the captured file. For example, if the template for the number "3" contained digital representation of 50 pixels, 25 "hits" would give a hit-ratio of 0.5. On the other hand, if the number "7" only contained 26 pixels, then only 13 hits would be needed to provide a hit ratio of 0.5. However, it is less likely that the number is "7" than "3" since only 13 pixels matched the "7" template.

Although the apparatus for performing the present invention has been described above, it should be observed that the method, also described above, need not be practiced with the described apparatus. For example, it might be possible to perform the character recognition processing at the remote computer or at a computer other than either the local computer or the remote computer. Nonetheless, the character recognition processing would still need to be performed. Likewise, it is possible that a video capture circuit capable of receiving an RGB composite signal directly from the RGB outputs of the video game terminal, without the necessity of using a composite converter, could be used. In this case, the function performed by the composite converter would then be performed within the video capture circuit, and an output capable of being captured would still be generated. The apparatus described above was described in the present form which comprises the best mode and the preferred embodiments of the apparatus. It is to be recognized that many details not provided are well known to those skilled in the art. For example, the method of setting up the software and the communication links to transmit player information and final score information to the remote computer is well established. Likewise, the control program and the score capture program and the final score verification program are all programs which we have written in known programming languages and, as disclosed herein are capable of easily being written by those skilled in the art.

Further, while we describe a "local computer" or the "local computer and the local network computer" as containing certain componentry, it should be obvious to one skilled in the art that these components may be spread over several independent computers and still accomplish the same purpose. For example, it would be possible to configure the apparatus of the present invention such that all of the local computer programs are contained on the local network computer and are only called to the local computer CPU as needed. Alternately, they could even be stored on the remote computer and called as necessary by the local computers via the communication device. In short, the term "local computer" may be viewed as comprising the collection of components and programs necessary to operate the apparatus of the present invention in conjunction with the remote computer.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. Apparatus for video game tournament competition, comprising:
   a video capture circuit having a video input connections for receiving video output signals from a video game terminal, a video capture processing circuit for capturing said video output signals in the form of a captured video file, and a video capture output for outputting said captured video file;

a local computer comprising a central processing unit, random access memory, a communication device capable of transmitting signals to and receiving signals, from a remote computer, a control program, and a character recognition program, said local computer configured, to receive into said random access memory said captured video file from said video capture circuit and extract any alphanumeric information therefrom using said character recognition program and transmit said extracted alphanumeric information to said remote computer via said communication device, all as directed by said control program.

2. Apparatus for video game tournament competition, comprising:

a composite converter, said composite converter having video input connections for receiving video output signals from a video game terminal, a video signal processing circuit for converting said video output signals into a capturable video signal, and a composite converter output for outputting said capturable video signal;

a video capture circuit having a video capture input in connection with said composite converter output, a video capture processing circuit for capturing said capturable video signal in the form of a captured video file, and a video capture output for outputting said captured video file; and a local computer comprising a central processing unit, random access memory, a communication device capable of transmitting signals to and receiving signals from a remote computer, a control program, and a character recognition program, said local computer configured to receive into said random access memory said captured video file from said video capture circuit and extract any alphanumeric information therefrom using said character recognition program and transmit said extracted alphanumeric information to said remote computer via said communication device, all as directed by said control program.

3. The apparatus of claim 2 further comprising a remote computer in communication with said local computer via said communication device, said remote computer configured to receive said extracted alphanumeric information from said local computer, said remote computer comprising a central memory device for storing said extracted alphanumeric information, a data base program for sorting said extracted alphanumeric information, and a master program for coordinating the receiving and sorting of said alphanumeric information.

4. The apparatus of claim 3 further comprising a data input station associated with said video game terminal, said data input station configured to receive player information pertaining to a given player of an identified video game at said video game terminal and communicate said player information to said local computer, wherein said local computer is configured to transmit said player information to said remote computer via said communication device.

5. The apparatus of claim 4 wherein:

for any said given player playing said identified video game at said video game terminal wherein associated player information is entered at said data input station and wherein said identified video game terminates with a final game score, said local computer is configured to identify said final game score from said extracted alphanumeric information and transmit said final game score to said remote computer via said communication device;

said remote computer is configured to store said player information and said final game score in said data base and correlate said final game score with said associated player information; and said remote computer is further configured to sort said player information and said final game score among a plurality of player information and final games scores.

6. The apparatus of claim 5 further comprising a local player display in communication with said local computer for displaying said player information and for prompting said given player.

7. The apparatus of claim 6 further comprising a local public display configured to display tournament information independent of a dedicated game display associated with said video game terminal, said public display being in communication with said local computer, and wherein said local computer is configured to receive information to be displayed on said local display from said remote computer via said communication device.

8. The apparatus of claim 6 wherein said local computer further comprises a score capture program, said score capture program configured to be initiated by input from said data input station, wherein said score capture program is configured to convert said captured video file into a format capable of being processed by said character recognition program, cause said video capture circuit to send said converted captured video file to said random access memory, and cause said character recognition program to process said converted captured video file to obtain said final score from said extracted alphanumeric information.

9. The apparatus of claim 8 wherein said score capture program is configured to be initiated by a manually activatable final score capture switch in communication with said local computer.

10. The apparatus of claim 9 further comprising a final score verification program, said final score verification program configured to cause said final score to be displayed at said local player display along with a prompt for said player to verify said final score.

11. The apparatus of claim 10 wherein said local computer further comprises a user interface program, said user interface program configured to prompt a player for inputs, receive said inputs, communicate said inputs to said local computer central processing unit, and receive and communicate output messages to said local player display.

12. The apparatus of claim 11 wherein said data base program is configured to sort a plurality of final game scores to determine a winning final game score, and said master program is configured to communicate said winning final game score along with certain of said associated player information to said local computer via said communication device, and wherein said local computer further comprises a high game score display program configured to communicate said highest final game score and certain of said associated player information to a visual output device in communication with said local computer.

13. In the apparatus of claim 2 wherein said video game terminal has a video screen for displaying said alphanumeric information, said alphanumeric information comprises individual alphanumeric characters having character identities, each said character corresponding to a portion of said captured video file, each said portion of said file corresponding to a position on said video screen, and wherein:

said character recognition program is configured to determine the identity of each said character by comparing each said portion of said captured video file to a set of templates, said set of templates comprising a separate template for each possible character identity, to determine which said character identity most nearly corresponds to said portion of said captured video file video.

14. The apparatus of claim 13 wherein said video game screen comprises a plurality of pixels, said captured video file comprises a digital representation of said pixels comprising said alphanumeric information, each said template comprises a digital representation of pixels having a high probability of representing an associated said character, and said character recognition program is configured to compare each said portion of said captured video file to said set of templates by:

a) determining the number of pixels associated with said portion of said file which correspond to pixels represented by said template;

b) determining the ratio of the number obtained in step (a) to the total number of pixels represented by said template;

c) repeating steps (a) through (b) for each said template in said set of templates to generate a set of said ratio numbers for said portion of said file;

d) selecting the highest ratio number from said set of ratio numbers and identifying said template and said associated character corresponding to said highest ratio number to identify the character having the greatest likelihood of being the character displayed by said pixels represented by said portion of said file;

e) repeating steps (a) through (d) for each said portion of said captured video file until all characters comprising said alphanumeric information have been identified.

15. The apparatus of claim 14 wherein said character recognition program is configured to perform the additional steps of:

a) for each said set of ratio numbers wherein no ratio number within said set exceeds a predetermined value, performing the additional step of determining the number of pixels associated with said portion of said file which lie outside of the pixels having a high probability of representing an associated said character;

b) repeating step (a) for each said template in said set of templates to generate a set of said numbers for said portion of said file associated with said set of ratio numbers;

c) combining the number determined in step (a) with the ratio number corresponding to the template used in step (a) for each number to produce a set of probability numbers, said probability numbers indicating the probability that said character matches said template; and d) selecting the probability number indicating the highest probability of a match between said portion of said file and said template from said set of probability numbers and identifying said template and said associated character corresponding to said probability number indicating the highest probability of a match to identify the character having the greatest likelihood of being the character displayed by said pixels represented by said portion of said file.

16. Apparatus for video game tournament competition, comprising:

a plurality of RGB composite converters, each said composite converter having video input connections for receiving RGB video output signals from a dedicated one a plurality of video game terminals, a video signal processing circuit for converting said video output signal into a capturable video signal, and a composite converter output for outputting said capturable video signal;

a plurality of video capture circuits, each said video capture circuit having a video capture input in connection with a dedicated one of said composite converter outputs, a video capture processing circuit for capturing said capturable video signal in the form of a captured video file, and a video capture output for outputting said captured video file;

a plurality of local computers, each said local computer comprising a central processing unit, random access memory, a network communication device for transmitting signals to and receiving signals from a local network computer, a control program, and a character recognition program, each said local computer configured to receive into said random access memory said captured video file from a dedicated one of said video capture circuits and extract any alphanumeric information therefrom using said character recognition program and transmit said extracted alphanumeric information to said network computer via said network communication device, all as directed by said control program; and a local network computer, said network computer comprising a local network communication device for transmitting signals to and receiving signals from each of said local computers via said network communication devices, a communication device capable of sending signals to and receiving signals from a remote computer, a memory storage device, and a network control program for managing the receipt of information from and transmission of information to said local computers and said remote computer.

17. Apparatus for video game tournament competition, comprising:

an RGB composite converter, said composite converter having video input connections for receiving RGB video output signals from a video game terminal, a video signal processing circuit for converting said video output signals into a capturable video signal, and a composite converter output for outputting said capturable video signal;

a video capture circuit having a video capture input in connection with said composite converter output, a video capture processing circuit for capturing said capturable video signal in the form of a captured video file, and a video capture output for outputting said captured video file; and a local computer comprising a central processing unit, random access memory, a communication device for transmitting signals to and receiving signals from a remote computer, and a control program, said local computer configured to communicate said captured video file to said remote computer via said communication device, all as directed by said control program.

18. The apparatus of claim 17 further comprising a remote computer in communication with said local network computer via said communication device, said remote computer configured to receive said captured video file from said local network computer, said remote computer comprising a character recognition program, a central memory device, a data base program, and a master program, wherein said remote computer is further configured to extract alphanumeric information from said captured video file using said character recognition program, store said extracted alphanumeric information in said central memory device, and sort a plurality of said extracted alphanumeric information using said data base program, all as directed by said master program.

19. Method of conducting video game tournament competition comprising:

receiving player information associated with each player of a video game in a video game tournament at a data entry station associated with a video game terminal at which said video game is played, wherein each said video game results in a final score which is associated with said player of said video game and said final score is displayed on a video screen associated with said video game terminal, said final score being displayed as a result of a video game screen output signal, wherein said video game screen output signal is communicated to said video screen by said video game terminal;

intercepting said video game screen output signal and communicating said intercepted video game screen output signal to a video capture circuit;

digitizing said video game screen output signal containing said final score with said video capture circuit;

saving each said digitized video game screen output signal into a computer memory;

processing each said digitized video game screen output signal using character recognition software to extract said final score from said digitized video game screen output signal;

saving each said extracted final score to said computer memory;

comparing all said extracted final scores to determine a winning extracted final score; and determining a winner of said video game tournament by identifying said player information associated with said winning extracted final score and identifying said player associated with said player information, wherein said identified associated player is said winner.

20. The method of claim 19 further comprising the step of communicating said extracted final scores and said associated player information to a central computer at a location remote from said video game terminal.

21. The method of claim 20 further comprising the step of communicating said extracted final scores and said associated player information from a plurality of video game terminals to said central computer.

22. The method of claim 21 wherein said extracted final scores and said associated player information is communicated to said central computer by Internet.

23. The method of claim 21 wherein each said video game terminal is located at a site, and further comprising the step of communicating said winning extracted final score and a portion of player information associated with said winner to a display located at least one said site.

24. Method for determining an alphanumeric character identity contained within a digitized captured video output file, said output file comprising groups of digital representations of pixels on a video screen wherein a said group may correspond to a displayed character, comprising:

a) comparing each said group of digital representations to a set of templates, said set of templates comprising a separate template corresponding to each possible character identity, each said template comprising a digital representation having a high probability of corresponding to a digital representation of a given alphanumeric character, to generate a set of ratio numbers for each said group of digital representations, wherein said comparison comprises:

i) determining the number of pixels associated with said given group of a digital representation of pixels which correspond to pixels represented by said template;

ii) determining the ratio of the number obtained in step (i) to the total number of pixels represented by said template;

iii) repeating steps (i) and (ii) for each said template until said set of ratio numbers has been generated;

b) selecting the character associated with the highest ratio number determined in step (a);

c) repeating steps (a) and (b) for each said group of digital representations of said captured video file until all characters comprising said alphanumeric information have been identified.

25. The method of claim 24 further comprising the steps of:

a) for each said set of ratio numbers wherein no ratio number within said set exceeds a predetermined value, performing the additional step of determining the number of pixels associated with said given group of a digital representation of pixels which lie outside of the pixels represented by each said template;

b) repeating step (a) for each said template in said set of templates to generate a set of said numbers for said group of a digital representation of pixels associated with said set of ratio numbers;

c) combining the number determined in step (a) with the ratio corresponding to the template used in step (a) for each said number to produce a set of probability numbers, said probability numbers indicating the probability that said character matches said template;

d) selecting the probability number indicating the greatest probability of a match between said group of a digital representation of pixels and said template from said set of probability numbers and identifying said template and said associated character corresponding to said probability number indicating the greatest probability of a match to identify the character having the greatest likelihood of being the character displayed by said pixels represented by said group of a digital representation of pixels.

26. Method for generating a set of templates for an alphanumeric character identity program, wherein said alphanumeric characters are contained in a digitized captured video output file, said output file comprising groups of digital representations of pixels of a color video screen which may correspond to displayed characters, comprising:

generating a plurality of example files for each such character, said example file comprising a digital representation of each said character and its background as said character and said background are displayed on said screen;

comparing said example files to each other for each such character to identify digital commonalities between said example files and to identify digital features indicative of digital representations of pixels which comprise said background;

creating a digital template for each said character, said template comprising a digital image of said commonalities and exclusive of said digital representations of said background.

27. The method of claim 26 wherein said digital image of said commonalities allows for a digital representation of a given pixel to be one of at least two colors.

* * * * *